United States Patent  [11] 3,616,213

[72] Inventors Ryuichiro Tsugawa, Tokyo; Takashi Nakase, Kanagawa-ken; Tadao Kobayshi, Kanagawa-ken; Koichi Yamashita, Kanagawa-ken; Shinji Okumura, Tokyo, all of Japan
[21] Appl. No. 791,502
[22] Filed Jan. 15, 1969
[45] Patented Oct. 26, 1971
[73] Assignee Ajinomoto Co., Inc. Tokyo, Japan
[32] Priorities Jan. 24, 1968
[33] Japan
[31] 43/4104; Mar. 4, 1968, Japan, No. 43/13938

[54] PRODUCTION OF α-KETOGLUTARIC ACID BY FERMENTATION OF HYDROCARBONS
5 Claims, No Drawings

[52] U.S. Cl. .................................................. 195/28
[51] Int. Cl. .................................................. C12b 1/00
[50] Field of Search ........................................ 195/28, 29, 47, 30, 37

[56] References Cited
OTHER REFERENCES
Finogenova, Mikrobiologiya, pp. 38–43, 1968 (Russ.), Vol. 37 (1)

*Primary Examiner*—A. Louis Monacell
*Assistant Examiner*—Robert M. Elliott
*Attorney*—Kurt Kelman ABSTRACT: α-ketoglutaric acid is obtained in good yields by aerobic culturing of certain strains of Candida and Saccharomyces on culture media containing hydrocarbons as principal carbon source. The yield is enhanced by the presence of trace amounts of vitamin $B_1$, $Zn^{++}$, $Cu^{++}$, and/ or $Fe^{++}$.

PRODUCTION OF α-KETOGLUTARIC ACID BY FERMENTATION OF HYDROCARBONS

This invention relates to the production of α-ketoglutaric acid by fermentation, and particularly to the production of α-ketoglutaric acid by micro organisms cultured on a medium which contains one or more hydrocarbons as the principal source of assimilable carbon.

α-ketoglutaric acid has been produced heretofore from media containing hydrocarbons a the principal carbon source by means of certain bacteria (French Pat. No. 1,447,541, British Pat. No. 1,085,823), but the fermentation rate of the known method and the yield of α-ketoglutaric acid are so low as to make the known process much less attractive than the known fermentation of culture media containing sugars as a carbon source.

It has now been found that certain yeasts of the genera Candida and Saccharomyces are capable of growing on culture media containing hydrocarbons as the principal or sole carbon source, and produce α-ketoglutaric acid in yields high enough to make the new process economically attractive. Suitable strains include Candida lipolytica AJ4541 (ATCC16617) and AJ4548 ATCC 16618), Candida cloacae AJ4719 (ATCC 20184), Candida tropicalis AJ4468 (IFO 0006), and Saccharomyces lactis AJ4070 (ATCC 20185).

The micro organisms may be grown on culture media which are entirely conventional, except for the use of hydrocarbons as the principal carbon source. They must contain a source of assimilable nitrogen and the usual minor nutrients necessary for microbial growth, such as certain inorganic ions and organic growth-promoting agents. The preferred hydrocarbons are those having 10 to 20 carbon atoms in a straight chain. The nitrogen source is not critical and may consist of ammonium salts, such as the sulfate, nitrate, chloride, phosphate, or carbonate, or urea.

Trace amounts of metal ions, vitamins, and amino acids improve the yield. The minor organic nutrients may be added to the culture medium in the form of crude mixtures, such as corn steep liquor, peptone, malt extract, or Aji-eki (a soybean hydrolyzate). Particularly good yields are obtained in the presence of vitamin $B_1$ in amounts of 0.5 to 100 γliter, preferably 1 to 10 γliter, and $Fe^{++}$ in the amounts of 0.0005 percent to 0.5 percent, preferably 0.001 to 0.02 percent (as $FeSO_4 \cdot H_2O$). Further improvement may be achieved by the presence of an $Zn^{++}$ in amounts of 1,000 p.p.m. or less, preferably 1 to 100 p.p.m. and/of $Cu^{++}$ in amounts of 100 p.p.m. or less, preferably 0.01 to 10 p.p.m.

The present process differs from all previous attempts producing α-ketoglutaric acid by fermentation from hydrocarbons as a carbon source by the accumulation of more than 2 grams/deciliter of the acid within a relatively short fermentation period, such as 3 days. α-ketoglutaric acid is a known starting material for the production of glutamic acid by fermentation, and the culture broths of this invention may be employed for the production of glutamic acid by known methods without recovery of the α-ketoglutaric acid in solid form. Minor amounts of glutamic acid are formed simultaneously with the α-ketoglutaric acid in the process of this invention, and are recovered when the α-ketoglutaric acid is converted to L-glutamic acid.

In carrying out the process of this invention, the hydrocarbon employed as a carbon manner: is dispersed in the otherwise aqueous culture medium, and held dispersed by mechanical means, as by shaking, which also ensures adequate aeration of the culture medium. Surface-active agents may be employed to enhance the dispersion of organic phase, but are not necessary. The amount of hydrocarbon present in the culture medium is not critical, but the area of the available hydrocarbon surface slightly affects the fermentation rate. The optimum amount of hydrocarbon is readily determined for available shaking or agitating equipment by a few test runs. A value of 8 percent of the total weight of the culture medium was found beneficial under the uniform shaking conditions employed in the following illustrative examples, but is to be considered as being merely typical. Less or more hydrocarbon may be used without drastic changes in the results achieved.

EXAMPLE 1

Agar slants were prepared from tap water and the following compounds in the usual manner:

| | |
|---|---|
| $NH_4NO_3$ | 0.1% |
| $MgSO_4 \cdot 7H_2$ | 0.02% |
| $KH_2PO_4$ | 0.15% |
| $Na_2HPO_4 \cdot 12H_2O$ | 0.35% |
| $CaCl_2$ | 0.0001% |
| $FeSO_4 \cdot 7H_2O$ | 0.0005% |
| Agar | 2.0% |
| KOH | to pH 7.4 |

Candida lipolytica AJ4548 (ATCC 16618) was precultured on the slants for 48 hours, and the pulp disks of microbial cells were steeped in a mixture of equimolecular amounts of n-paraffins having 14, 15, and 16 carbon atoms, respectively.

A sterile culture medium divided into 20 ml. batches had a pH of 5.5 and the following composition:

| | |
|---|---|
| Equimolecular mixture of n-paraffins $C_{12}$ to $C_{17}$ | 8% |
| $KH_2PO_4$ | 0.2% |
| $MgSO_4 \cdot 7H_2O$ | 0.1% |
| $FeSO_4 \cdot 7H_2O$ As shown in table 2 or | 0.02% |
| $NH_4NO_3$ | 2% |
| $CaCO_3$ | 2% |
| Vitamin $B_1$ As shown in table 1 or | 3 γ/liter |

Each batch was inoculated in a 500 ml. shaking flask with the precultured Candida lipolytica AJ4548, and shaken at 31.5° C. for 3 days. The growth of the yeast was then determined by measuring the optical density (O.D.) of a specimen of the broth diluted with 25 volumes of water, and the concentration of α-ketoglutaric acid (α-KGA) was determined by the method of Freidenmann and L-glutamic acid was determined by the method of microbiological assay.

The medium was kept weakly acid during fermentation by periodic additions of calcium carbonate, ammonia, or sodium hydroxide. Except when ferrous sulfate was totally absent, substantial amounts of α-ketoglutaric acid accumulated in the medium together with minor amounts of L-glutamic acid.

The influence of varying amounts of vitamin $B_1$ in the culture medium at constant ferrous sulfate, and of varying amounts of ferrous sulfate at constant vitamin $B_1$ concentration on the growth and yield of α-ketoglutaric acid are evident from tables 1 and 2, respectively.

TABLE 1

| | Vitamin $B_1$, γ/liter | | | | | | |
|---|---|---|---|---|---|---|---|
| | 0 | 1 | 3 | 5 | 10 | 100 | 1,000 |
| Growth (O.D.) | 0.08 | 0.30 | 0.68 | 0.75 | 0.90 | 1.22 | 1.32 |
| α-KGA, g./dl. | 2.33 | 4.05 | 3.28 | 2.16 | 0.83 | | 0.42 |

TABLE 2

| | $FeSO_4 \cdot 7H_2O$, percent | | | | | | |
|---|---|---|---|---|---|---|---|
| | 0 | 0.0005 | 0.001 | 0.01 | 0.02 | 0.05 | 0.10 |
| Growth (O.D.) | 0.10 | 0.51 | 0.63 | 0.65 | 0.63 | 0.63 | 0.68 |
| α-KGA, g./dl. | 0 | 1.22 | 3.12 | 4.05 | 3.92 | 2.35 | 2.28 |

The concentration of vitamin $B_1$ and of ferrous ions in the culture medium thus has an important bearing on the amounts of α-ketoglutaric acid that can be accumulated in the culture medium in a short time. Other conventional ingredients are less important as long as maintained within the usual limits.

EXAMPLE 2

A sterile, aqueous culture medium was prepared from the following compounds:

| | |
|---|---|
| Equimolecular mixture of n-paraffins $C_{12}$ to $C_{17}$ | 8% |
| $KH_2PO_4$ | 0.5% |
| $MgSO_4 \cdot 7H_2O$ | 0.1% |
| $FeSO_4 \cdot 7H_2O$ | 0.02% |

| | |
|---|---|
| $MnSO_4 \cdot 4H_2O$ | 0.002% |
| $(NH_4)_2SO_4$ | 1.0% |
| $NH_4NO_3$ | 1.0% |
| Aji-eki (a registered Trademark for a commercial soybean protein hydrolyzate) | 0.3 ml./dl. |
| $CaCO_3$ | 2% |

The medium was adjusted to pH 5.5, and 20 ml. batches in 500 ml. shaking flasks were inoculated with the micro organisms listed in table 3 from agar slants prepared as in example 1, and shaken at 31.5° C. for 3 days. The amount of α-ketoglutaric acid and L-glutamic acid accumulated in the broth were determined, and the cells were then removed from the broth by centrifuging. Cations in the fermentation broth were removed by passing the broth through a column of cation-exchange resin, Amberlite IR-120 ($H^+$-form).

Thus-obtained free α-ketoglutaric acid was partly evaporated in a vacuum to induce crystallization of the acid. The amounts of crystalline α-ketoglutaric acid so recovered are listed in table 3, together with the amounts of acid (GA) present in the fermented broth.

| | Grams per Deciliter | | |
|---|---|---|---|
| Micro-organism | α-KGA in broth | α-KGA recovered | GA in broth |
| Candida lipolytica AJ4541 | 4.50 | 3.00 | 0.15 |
| Candida cloacae AJ4719 | 1.35 | 0.88 | 0.08 |
| Candida tropicalis AJ4468 | 4.10 | 2.80 | 0.18 |
| Candida lipolytica AJ4548 | 4.82 | 3.18 | 0.05 |
| Saccharomyces lactis AJ4070 | 1.20 | 0.80 | 0.02 | when the culture medium was modified to include an equimolecular mixture of $C_{14}$ to $C_{16}$ n-paraffins as the carbon source, 2% $NH_4NO_3$ as the nitrogen source, and 0.02 percent of corn steep liquor as a growth promotor instead of the Aji-eki, Candida tropicalis AJ4468 produced 3.05 g./dl. α-ketoglutaric acid and 0.13 g./dl. L-glutamic acid in the broth under otherwise unchanged conditions, and Candida lipolytica AJ4548 produced 5.13 and 0.16 g./dl. respectively

EXAMPLE 3

A commercial mixture of normal paraffins consisting of trace amounts to $C_{11}$, 7% $C_{12}$, 24% $C_{13}$, 19% $C_{14}$, 39% $C_{15}$, 8% $C_{16}$, 1% $C_{17}$, and traces of $C_{18}$-$C_{20}$ was used as a carbon source in an otherwise aqueous, sterile, culture medium having an initial pH of 6.0 and the following composition:

| | |
|---|---|
| Paraffin mixture | 8% |
| $NH_4NO_3$ | 2% |
| $KH_2PO_4$ | 0.2% |
| $MgSO_4 \cdot 7H_2O$ | 0.1% |
| $FeSO_4 \cdot 7H_2O$ | 0.02% |
| Corn steep liquor | 0.02% |
| $CaCO_3$ | 2% |

One-half of the medium was further enriched with zinc sulfate to provide 10 p.p.m. $Zn^{++}$. Twenty ml. batches of the two media were inoculated with the five micro organisms listed in example 2 which had been precultured on agar slants as in example 1, a 500 ml. shaking flask being employed for each batch and shaken for 13 days at 31.5° C. The concentration of α-ketoglutaric acid and L-glutamic acid was determined in each broth, and crystalline α-ketoglutaric acid was recovered only from the zinc-bearing culture media by the methods described above in example 2. The beneficial effects of zinc are evident from the data tabulated in table 4.

TABLE 4

| | No zinc, g./dl. in broth | | 10 p.p.m. $Zn^{++}$, g./dl. | | |
|---|---|---|---|---|---|
| | | | α-KGA | | GA, broth |
| Microorganism | α-KGA | GA | Broth | Recov'd | |
| Cand. lip. AJ4541 | 4.20 | 0.12 | 5.25 | 3.53 | 0.15 |
| Cand. cloacae AJ4719 | 1.12 | 0.08 | 2.20 | 1.50 | 0.13 |
| Cand. tropicalis AJ4468 | 3.63 | 0.16 | 4.20 | 2.80 | 0.21 |
| Cand. lip. AJ4548 | 4.66 | 0.05 | 5.52 | 3.85 | 0.09 |
| Cacch. lactis AJ4070 | 1.20 | 0.02 | 1.82 | 1.32 | 0.05 |

EXAMPLE 4

In a modification of the procedure of example 3, the corn steep liquor in the medium was replaced by 3 γ/liter vitamin $B_1$, and the zinc ions in a portion of the medium by 1 p.p.m. $Cu^{++}$. The amounts of α-ketoglutaric acid accumulated in the several broths obtained by fermentation with the micro-organisms of table 4 were as follows:

TABLE 5

| | α-KGA in broth, g./dl. | |
|---|---|---|
| | Without $Cu^{++}$ | With 1 p.p.m. $Cu^{++}$ |
| Cand. lip. AJ4541 | 3.82 | 5.15 |
| Cand. cloacae AJ4719 | 0.93 | 1.83 |
| Cand. topicalis AJ4468 | 2.35 | 3.02 |
| Cand. lip. AJ4548 | 4.68 | 5.63 |
| Sacch. lactis AJ4070 | 1.02 | 1.92 |

EXAMPLE 5

Pure straight-chained paraffins having 10 to 20 carbon atoms were used as respective carbon sources in culture media of the following composition:

| | |
|---|---|
| n-paraffin | 8% |
| $NH_4NO_3$ | 2% |
| $(NH_4)_2SO_4$ | 1% |
| $KH_2PO_4$ | 0.2% |
| $MgSO_4 \cdot 7H_2O$ | 0.1% |
| $FeSO_4 \cdot 7H_2O$ | 0.005% |
| Vegetable protein hydrolyzate | 0.5 ml/dl |
| $CaCO_3$ | 2 percent |
| $Zn^{++}$ | none or 5 p.p.m. |
| $Cu^{++}$ | none or 0.5 p.p.m. |

When batches of the above media were inoculated with Candida lipolytica AJ4548 cultured aerobically as described in the preceding examples, α-ketoglutaric acid accumulated in the several broths in the amounts indicated in table 6.

TABLE 6

| Carbon atoms in paraffin | α-ketoglutaric acid in broth, g./dl. | | |
|---|---|---|---|
| | Without Cu, Zn | 5 p.p.m. $Zn^{++}$ | 0.5 p.p.m. $Cu^{++}$ |
| 10 | 3.80 | 4.56 | 4.32 |
| 11 | 3.95 | 4.42 | 4.25 |
| 12 | 3.98 | 4.62 | 4.53 |
| 13 | 4.28 | 4.83 | 4.75 |
| 14 | 4.36 | 4.82 | 4.69 |
| 15 | 4.32 | **4.98 | 4.88 |
| 16 | 4.42 | 5.31 | 5.09 |
| 17 | 4.53 | 5.42 | 5.30 |
| 18 | 4.50 | 5.51 | 5.50 |
| 19 | 4.59 | 5.49 | 5.30 |
| 20 | 3.10 | 4.32 | 4.40 |

EXAMPLE 6

When cultured on a medium containing an equimolecular mixture of normal paraffins $C_{16}$ to $C_{19}$, but otherwise as described in example 5 and containing either no zinc and copper or both 5 p.p.m. $Zn^{++}$ and 0.5 p.p.m. $Cu^{++}$, *Candida lipolytica* AJ4541 produced 4.43 and 5,42 g./dl. α-ketoglutaric acid respectively under the conditions of the preceding examples.

What we claim is:

1. A process for producing α-ketoglutaric acid by fermentation, which comprises inoculating a culture medium containing a source of assimilable nitrogen, necessary minor nutrients, and at least one hydrocarbon as a main carbon source with a micro organism of the genus *Candida* or the genus *Saccharomyces capable of assimilating said hydrocarbon and of producing a α-ketoglutaric acid from the assimilated hydrocarbon, and aerobically culturing the inoculated medium until α-ketoglutaric acid is produced therein and recovering α-ketoglutaric acid from the medium*.

2. A process as set forth in claim 1, in which said hydrocarbon is a straight-chained paraffin having 10 to 20 carbon atoms.

3. A process as set forth in claim 1, wherein said minor nutrients include a trace amount of vitamin $B_1$, $Fe^{++}$, $Zn^{++}$ or $Cu^{++}$ sufficient to enhance the yield of said α-ketoglutaric acid.

4. A process as set forth in claim 1, wherein said micro organism is *Candida lipolytica* AJ4541 (ATCC 16617), AJ4548 (ATCC 16618). *Candida cloacae* AJ4719 (ATCC 20184, *Candida tropicalis* AJ4468 (IFO 0006), or *Saccharomyces lactis* AJ4070 (ATCC 20185).

A process as set forth in claim 4, wherein said inoculated medium is cultured until the concentration of said α-ketoglutaric acid exceeds 2 grams per deciliter.